United States Patent
Berry et al.

(10) Patent No.: US 9,702,026 B2
(45) Date of Patent: Jul. 11, 2017

(54) PROCESSES FOR THE RECOVERY OF URANIUM FROM INDUSTRIAL PHOSPHORIC ACID USING DUAL OR SINGLE CYCLE CONTINUOUS ION EXCHANGE APPROACHES

(71) Applicants: K-TECHNOLOGIES, INC., Lakeland, FL (US); OCP S.A., Casablanca (MA)

(72) Inventors: William W Berry, Lakeland, FL (US); Thomas E. Baroody, Lakeland, FL (US); Driss Dhiba, Casablanca (MA); Mounir El Mahdi, Casablanca (MA)

(73) Assignees: K-Technologies, Inc., Lakeland, FL (US); OCP S.A., Casablanca (MA)

(*) Notice: Subject to any disclaimer, the term of this patent is extended or adjusted under 35 U.S.C. 154(b) by 59 days.

(21) Appl. No.: 14/416,271

(22) PCT Filed: Jul. 21, 2013

(86) PCT No.: PCT/US2013/051417
§ 371 (c)(1),
(2) Date: Jan. 21, 2015

(87) PCT Pub. No.: WO2014/018422
PCT Pub. Date: Jan. 30, 2014

(65) Prior Publication Data
US 2015/0203939 A1 Jul. 23, 2015

Related U.S. Application Data

(60) Provisional application No. 61/674,297, filed on Jul. 21, 2012, provisional application No. 61/716,630, filed on Oct. 22, 2012.

(51) Int. Cl.
*C22B 60/00* (2006.01)
*C22B 60/02* (2006.01)
(Continued)

(52) U.S. Cl.
CPC .......... *C22B 60/0265* (2013.01); *B01J 39/05* (2017.01); *B01J 45/00* (2013.01); *B01J 49/00* (2013.01);
(Continued)

(58) Field of Classification Search
CPC .... B01J 49/00; B01J 49/0008; B01J 49/0069; B01J 49/0065; B01J 45/00; B01J 39/043;
(Continued)

(56) References Cited

U.S. PATENT DOCUMENTS 4,280,904 A * 7/1981 Carlson .............. B01J 47/10
210/189
4,341,638 A * 7/1982 Berry .............. C01B 25/235
209/5

(Continued)

FOREIGN PATENT DOCUMENTS

EP 132902 * 2/1985

*Primary Examiner* — Steven Bos
(74) *Attorney, Agent, or Firm* — Lee & Hayes, pllc (57) ABSTRACT

In alternative embodiments, the invention provides processes and methods for the recovery, removal or extracting of, and subsequent purification of uranium from a wet-process phosphoric acid using a continuous ion exchange processing approach, where the uranium is recovered from a phosphoric acid, or a phos-acid feedstock using either a dual or a single stage extraction methodology. In both cases an intermediate ammonium uranyl-tricarbonate solution is formed. In alternative embodiments, in the dual cycle approach, this solution is contacted in a second continuous ion exchange system with a strong anion exchange resin then subsequently recovered as an acidic uranyl solution that is further treated to produce an intermediate uranyl peroxide compound which is ultimately calcined to produce the final uranium oxide product. In alternative embodiments, in the single cycle case, the intermediate ammonium uranyl-tricarbonate solution is evaporated to decompose the ammonium (Continued)

carbonate and produce an intermediate uranium carbonate/oxide solid material. These solids are digested in an acid medium, and then processed in the same manner as the secondary regeneration solution from the dual cycle process to produce an intermediate uranyl peroxide that is calcined to produce a final uranium oxide product.

34 Claims, 2 Drawing Sheets

(51) Int. Cl.

| | | |
|---|---|---|
| *C01B 25/238* | (2006.01) | |
| *C01G 43/01* | (2006.01) | |
| *C01G 43/00* | (2006.01) | |
| *B01J 45/00* | (2006.01) | |
| *B01J 49/00* | (2017.01) | |
| *C22B 3/42* | (2006.01) | |
| *C22B 3/44* | (2006.01) | |
| *C22C 28/00* | (2006.01) | |
| *B01J 39/05* | (2017.01) | |
| *B01J 49/06* | (2017.01) | |
| *B01J 49/50* | (2017.01) | |
| *B01J 49/53* | (2017.01) | |

(52) U.S. Cl.
CPC ............... *B01J 49/06* (2017.01); *B01J 49/50* (2017.01); *B01J 49/53* (2017.01); *C01B 25/238* (2013.01); *C01G 43/003* (2013.01); *C01G 43/01* (2013.01); *C22B 3/42* (2013.01); *C22B 3/44* (2013.01); *C22B 60/0204* (2013.01); *C22B 60/0217* (2013.01); *C22C 28/00* (2013.01)

(58) Field of Classification Search
CPC ............ C22B 60/0265; C22B 60/0217; C22B 60/0204; C22C 28/00; C01G 43/003; C01G 43/01; C01B 25/238
USPC .......................... 423/321.1, 7; 210/660–688
See application file for complete search history.

(56) References Cited

U.S. PATENT DOCUMENTS

| | | | | |
|---|---|---|---|---|
| 4,385,993 | A * | 5/1983 | Hedrick | B01J 49/003 210/189 |
| 4,774,262 | A * | 9/1988 | Blanquet | B01J 39/12 521/25 |
| 8,557,201 | B1 * | 10/2013 | Rezkallah | C02F 1/42 210/670 |
| 2013/0343969 | A1 * | 12/2013 | Bromberg | B01J 20/28009 423/7 |

* cited by examiner

FIGURE 2

PROCESSES FOR THE RECOVERY OF URANIUM FROM INDUSTRIAL PHOSPHORIC ACID USING DUAL OR SINGLE CYCLE CONTINUOUS ION EXCHANGE APPROACHES

RELATED APPLICATIONS

This application is a national phase application claiming benefit of priority under 35 U.S.C. §371 to Patent Convention Treaty (PCT) International Application Serial No: PCT/US2013/051417, filed Jul. 21, 2013, which claims benefit of priority to U.S. Provisional Patent Application Ser. No. ("USSN") 61/674,297, filed Jul. 21, 2012; and U.S. Ser. No. 61/716,630, filed Oct. 22, 2012. The aforementioned applications are expressly incorporated herein by reference in their entirety and for all purposes.

TECHNICAL FIELD

This invention generally relates to inorganic chemistry and uranium (U) recovery. In particular, in alternative embodiments, the invention provides processes and methods for the recovery, removal or extracting of, and subsequent purification of uranium from a wet-process phosphoric acid using a continuous ion exchange processing approach, where the uranium is recovered from a phosphoric acid or a phos-acid feedstock using an ion exchange approach using either a dual or a single cycle extraction methodology.

BACKGROUND

The presence of uranium (U) in wet-process phosphoric acid has been well established and various attempts to recover this valuable material have been made over the years. In the mid-1950's various precipitation and solvent extraction methods were attempted with varying degrees of success. The discovery of lower cost deposits of uranium in the western U.S. resulted in loss of interest in phos-acid ($P_2O_5$) as a uranium source at that time.

With the subsequent growth in the nuclear power industry and concerns of potential uranium supply shortfalls, interest rekindled in the early 1970's and as a result several uranium recovery facilities were constructed and utilized better solvent extraction methods, primarily based on the so-called DEPA-TOPO process that was developed at the Oak Ridge National Laboratory (ORNL). At that time, there was interest in having a non-solvent extraction system that would eliminate some of the operational issues associated with the solvent extraction systems. Unfortunately, there were no continuous contacting systems deemed applicable to this task, thus solid/liquid contacting techniques were not investigated to any great extent.

With the subsequent decline in the $U_3O_8$ from the phos-acid ($P_2O_5$) industry in the 1990's, there was little commercial-oriented interest in alternate recovery techniques, although some work continued at an academic and research level. With the resurgence of the uranium industry in the early to mid-2000 decade, opportunities now exist for advanced and/or simplified techniques to recover uranium from this important source.

Ion exchange was and continues to be a popular method for uranium recovery from more conventional aqueous uranium-containing sources, i.e. copper tailings, leached sandstone ores, etc. The use of fixed bed ion exchange contacting systems has been established in some of the conventional hydrometallurgical industries, such as uranium, and indeed has proven effective for the recovery of uranium from various sulfate and carbonate solutions.

In the early 1980's a continuous ion exchange system was developed that was originally applied to the treatment of solutions containing higher concentrations of salts or processing requiring the regeneration of relatively large quantities of ion exchange resin per unit of process fluid treated. Conventional fixed bed systems have historically had limitations when it comes to some of these unique applications. The development of the continuous ion exchange system came after the decline in the uranium from phosphoric acid industry. Thus there was little interest in the application of this advanced contacting technology to phosphoric acid as a uranium source.

As a result of the resurgence in the demand for uranium from any source, phosphoric acid sources are again being evaluated, especially in light of growth forecasts of uranium demand outstripping supply over the next several decades. Thus, there is a renewed interest in recovering uranium and the possibility of applying advance continuous ion exchange techniques is now an opportunity. A method for uranium recovery from wet-process phosphoric acid would be beneficial to the industry as a result of the inherent safety, capital and operating cost advantages that would be useful to the phosphoric acid and uranium industries.

SUMMARY

The present invention provides a processes and methods for the recovery, removal or extracting of and subsequent purification of uranium (U) from a wet-process phosphoric acid using a dual or a single extraction continuous ion exchange processing approach. Processes and methods of the invention comprise dual or a single extraction continuous ion exchange systems that can be operated in a relatively simple, straightforward fashion.

Dual Cycle Uranium Extraction Processes

In alternative embodiments, processes and methods of the invention comprise use of a solid contacting media comprising ion exchange resin, e.g., as beads, or equivalent composition or material, to extract uranium (U) from a phosphoric acid source, e.g., a phos-acid ($P_2O_5$) or a phos-acid feedstock. In alternative embodiments, a modified continuous ion exchange contacting system that allows for an effective process extraction is used. In alternative embodiments, the continuous ion exchange contacting system of the invention comprises treatment and extraction methods or processes.

In this exemplary dual cycle ion exchange recovery process of the invention, solid, ion exchange resin, e.g., as beads, or equivalent composition or material, are used to extract the uranium contained in the phosphoric acid. The treated, low uranium phosphoric acid can be returned to a phosphoric acid facility. In this exemplary process, a specific resin is used that extracts (or binds to) uranium from the phosphoric acid source (e.g., phos-acid ($P_2O_5$), phos-acid feedstock), followed by subsequent stripping, or regeneration, of the uranium (as an eluate) from the resin, or equivalent composition or material, with a separate stripping (or elution) agent or combination of agents. Any uranium-binding resin can be used, e.g.: LEWATIT® TP 260™ (Lanxess, Maharashtra, India), a weakly acidic cationic exchange resin with chelating amino methyl phosphonic acid groups for the selective removal of transition heavy metals; AMBERLITE IRC-747™, an aminophosphonic chelating resin (Dow; Rohm & Haas, Philadelphia, Pa.); and S-930™, a macroporous polystyrene based chelating resin, with iminodiacetic groups designed for the removal of cations of heavy metals (Purolite, Bala Cynwyd, Pa.); and equivalents thereof.

Figure 1:
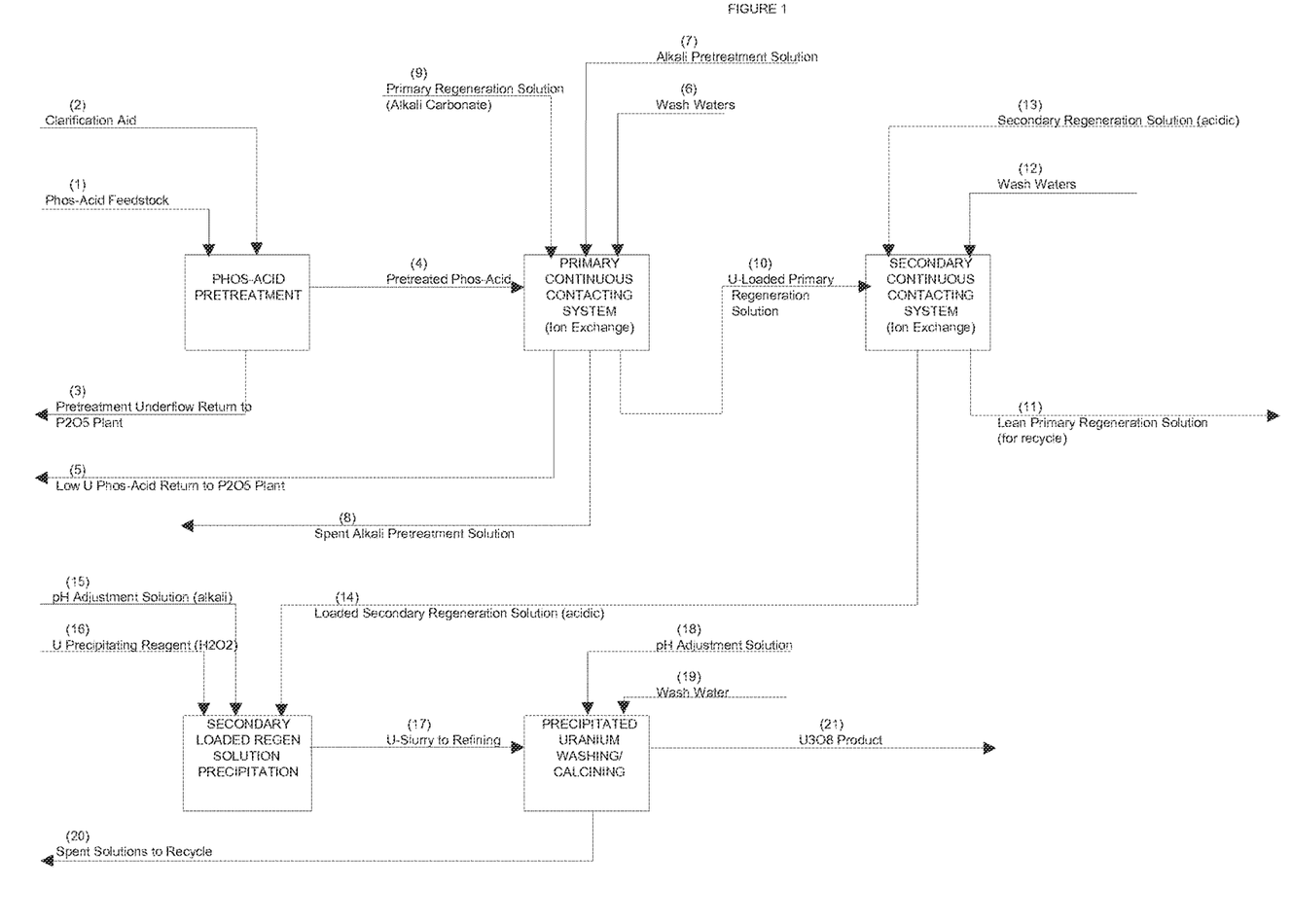
FIG. 1 schematically illustrates an exemplary "dual cycle" process of the invention, an overall process flow diagram for this exemplary "dual cycle" uranium extraction or recovery process from a phosphoric acid solution, or a solution comprising a phosphoric acid, or a phos-acid feedstock, using ion exchange resins.

In this exemplary dual cycle ion exchange recovery process of the invention, the recovery of uranium from the phosphoric acid source (e.g., phos-acid ($P_2O_5$), phos-acid feedstock) comprise use of a 2-stage extraction/stripping system, where the stripping or regeneration solution for the primary circuit is further treated and processed in a secondary cycle to recover a concentrated a uranyl solution for feed to the uranium refining section, e.g., as illustrated in FIG. 1.

In alternative embodiments, the phos-acid is first pre-treated with a filtering or clarification aids to remove all or substantially all suspended solids from the solution, along with a slight degree of dissolved color-bodies. In alternative embodiments comprising use of ion exchange approaches, the degree of color body removal required is significantly less than is associated with solvent extraction systems, thus the pretreatment needs for the phos-acid, prior to uranium (U) recovery, are considerably reduced and simplified with the use of the continuous ion exchange approach.

The invention provides processes and methods for the isolation, extraction or recovery of a uranium or a uranium oxide from a wet-process phosphoric acid using a continuous ion exchange system, comprising:

(a) providing a phosphoric acid solution, or a solution comprising a phosphoric acid, or a phos-acid feedstock, comprising a uranium or a uranium oxide,
  wherein optionally the phosphoric acid streams with $P_2O_5$ concentrations ranging from about 1% to about 60% $P_2O_5$/weight, or between about 20% and about 57% $P_2O_5$/weight;

(b) providing a continuous ion exchange system comprising a resin or an equivalent material or composition capable of binding the uranium or a uranium oxide (also called "a complexing resin"),
  wherein optionally the resin or material comprises or is:
    LEWATIT® TP 260™ (Lanxess, Maharashtra, India), a weakly acidic cationic exchange resin with chelating amino methyl phosphonic acid groups for the selective removal of transition heavy metals, or equivalent;
    AMBERLITE IRC-747™, an aminophosphonic chelating resin, or equivalent (Dow (Midland, Mich.); Rohm & Haas, Philadelphia, Pa.);
    PUROLITE S-930™, a macroporous polystyrene based chelating resin, with iminodiacetic groups designed for the removal of cations of heavy metals, or equivalent (Purolite, Bala Cynwyd, Pa.);
    a resin, composition or a material, or a non-resin solid or a semi-solid material, comprising chelating groups, functionalities or moieties that can bind uranium (U) and that comprise iminodiacetic groups, chelating aminomethyl phosphonic acid groups or aminophosphonic groups, or similar chelating functionalities or moieties, wherein optionally the compositions comprise beads, wires, meshes, nanobeads, nanotubes, nanowires or other nano-structures, or hydrogels.

(c) treating or pre-treating, or filtering, the phosphoric acid solution, solution comprising a phosphoric acid or a phos-acid feedstock with a clarification process or a filtering process, or a clarification aid,
  wherein optionally the clarification process, filtering process or clarification aid comprises an activated clay, an activated carbon, an activated silica, or equivalents or similar clarification material, or any combination thereof;

(d) applying the treated, pre-treated, or clarified solution or phosphoric acid solution or phos-acid feedstock of (c) to the resin, or other chelating material or composition of (b), under conditions that cause the uranium (U) to remain on or bind to the resin or material,
  wherein optionally an effluent is produced that is substantially free of the uranium (U), and substantially most of the uranium (U) remains bound to the strong cation exchange resin,
  and optionally the complexing resin is used to remove the uranium (U) from the phos-acid and load the uranium (U) onto the selected complexing ion exchange resin; and (e) recovering the uranium (U) from the resin, or other chelating material or composition, by treating the uranium-loaded resin with an alkali solution to neutralize the free acidity in the resin or other chelating material; followed by regenerating the resin or chelating material using an alkali carbonate solution or equivalent, optionally an ammonium carbonate, a sodium carbonate, or a potassium carbonate, at a pH that is greater than about 9.0, or greater than about 9.1, 9.2, 9.4 or 9.5, to produce a "primary loaded regeneration solution";
  and optionally alkali concentrations range from 0.5 molar to 3 molar, or between 1 and 2 molar.

In alternative embodiments, the regeneration of the uranium-loaded resin, or other chelating material or composition, comprises contacting the loaded resin, or other chelating material or composition, with a solution of alkali carbonate, or equivalent, optionally an ammonium carbonate, a sodium carbonate, or a potassium carbonate, to convert the uranium to an anionic carbonate complex, which has no affinity for the chelating, or other chelating material or composition, and producing an intermediate primary regeneration solution that is smaller in volume, when compared to the primary phosphoric acid flow, and which also contains a higher concentration of uranium in the solution phase.

In alternative embodiments, the processes and methods of the invention further comprise washing the regenerated resin, or other chelating material or composition, (from which the uranium (U) has been released, or eluted) with a water, or slightly acidic solution to remove any entrained alkali in the intermediate regeneration solution from the resin, or other chelating material or composition, prior to its reentry into the uranium extraction stage of the continuous ion exchange system.

In alternative embodiments, the processes and methods of the invention further comprise treating the intermediate primary regeneration solution in a second continuous ion exchange system comprising an anion exchange resin or equivalent material or composition, wherein the solution is contacted with the anion exchange resin or equivalent material or composition, and the anion uranium complex is removed from the intermediate primary regeneration solution as an anionic complex.

In alternative embodiments, the processes and methods of the invention further comprise treating the anionic resin, or equivalent composition or material, that has been loaded with the uranium with a water solution to remove the entrained intermediate primary solution from the resin, or equivalent composition or material.

In alternative embodiments, the processes and methods of the invention further comprise treating the washed secondary cycle anionic resin, or equivalent composition or material, with an acidic solution (the "secondary regeneration solution") to remove the uranium from the resin, or equivalent composition or material, by converting the uranium complex to a cationic form which has little affinity for the anion exchange resin, or equivalent composition or material, wherein optionally the acid solution comprises a weak sulfuric acid, nitric acid, hydrochloric acid or equivalent solution.

In alternative embodiments, the initial contacting of the resin, or equivalent composition or material, with the acid solution is carried out in an up-flow operational mode and results in the decomposition of any residual carbonate solution in the ion exchange resin, or equivalent composition or material, and assists in the expansion of the resin bed, with the resulting production of an acidic uranium-containing secondary loaded regeneration solution.

In alternative embodiments, the processes and methods of the invention further comprise the treatment of the regenerated resin, or equivalent composition or material, from the secondary regeneration stage with water to remove entrained acidic regeneration solution.

In alternative embodiments, the processes and methods of the invention further comprise post-treating the anionic resin, or equivalent composition or material, with an alkali solution to neutralize any residual acidity in the resin, or equivalent composition or material, prior to its reentry into the secondary uranium extraction zone where the resin, or equivalent composition or material, is contacted with incoming primary cycle loaded ammonium uranyl-tricarbonate solution which contains the uranium recovered from the primary cycle, in order to minimize any neutralization of the carbonate solution in the secondary extraction stages, and optionally further comprising treating the uranium-loaded secondary regeneration solution with an alkali solution to raise the pH of the solution to between about pH 2.5 to about pH 7, or to between about pH 3.5 to about pH 6, and optionally the alkali solution comprises an alkali hydroxide, optionally an ammonium hydroxide, a sodium hydroxide or equivalents, at concentrations ranging from 10% to about 30%; and optionally the alkali solutions will generally have pH's greater than pH 10 in their solution form.

In alternative embodiments, the processes and methods of the invention further comprise the addition of a hydrogen peroxide to the pH adjusted solution in an amount sufficient to form a uranyl peroxide compound and allow for excess peroxide to be present in the solution to ensure complete uranyl peroxide precipitation.

In alternative embodiments, the processes and methods of the invention further comprise the separation of the uranyl peroxide precipitate from the solution phase, optionally utilizing: settling; filtration, centrifugation, and equivalents, then washing the solids with water in a conventional approach, optionally comprising washing the solids on a filter; or repulping of the solids with water, followed by settling or filtration or centrifugation or equivalents, and optionally further comprising additional washing of the uranyl peroxide with water to remove the bulk of any entrained secondary solution (uranium-free) via additional filter washing; and optionally washing within a centrifuge or additional repulping with water followed by settling.

In alternative embodiments, the processes and methods of the invention further comprise drying the uranyl peroxide to form a dry solid material, and optionally the dry uranyl peroxide is further heated to a temperature sufficient to decompose or calcine (e.g., heating to a high temperature but below the melting or fusing point, causing loss of moisture, reduction or oxidation, and the decomposition of carbonates and other compounds) the uranyl peroxide and form a uranium oxide compound ($U_3O_8$).

Single Cycle Uranium Extraction Processes

In alternative embodiments of the "single cycle" exemplary method of the invention, a solid contacting media, such as ion exchange resin beads, are used to extract uranium (U) from a phosphoric acid source, e.g., a phos-acid ($P_2O_5$) or a phos-acid feedstock. In alternative embodiments, a modified continuous ion exchange contacting system is used that provides an effective process extraction and treatment methodology when compared to non-continuous systems, and provides the ability to produce an ammonium uranyl tricarbonate solution from a single extraction step.

In alternative embodiments of the ion exchange recovery process of the invention, solid, ion exchange resin beads, or equivalent materials, are used to extract the uranium contained in the phosphoric acid source. The treated (low uranium phosphoric acid) can be returned to the phosphoric acid facility.

In alternative embodiments, the invention provides a $U_3O_8$ recovery system from a phos-acid source comprising use of a specific resin or equivalent material that can extract uranium (U) from the phosphoric acid source, e.g., a phos-acid ($P_2O_5$) or a phos-acid feedstock, with subsequent regeneration of the resin with a separate regeneration agent or combination of agents. Specialized resins or equivalent materials, as described herein, are used for this purpose, and the extent of resins and equivalent materials available for unique applications has increased considerably over the past 15 to 20 years. This advancement in the availability of resin and equivalent materials has also been spurred by the development and availability of continuous contacting systems that allow for more efficient contacting and operability.

In alternative embodiments of the invention's continuous processes for the recovery of uranium (U) from a phos-acid ($P_2O_5$), a single stage extraction/regeneration system is used where the regeneration solution for the primary circuit is heated to decompose the excess ammonium carbonate in the solution; lower the pH; then subsequently precipitate the uranium as an ammonium uranyl carbonate material. This precipitate is digested in an acid solution, such as sulfuric acid, and then subsequently refined via the pH adjustment of the solution to about 3 to about 5, followed by treatment of the partially neutralized solution with hydrogen peroxide or equivalent to precipitate a uranyl peroxide material, finally followed by drying and calcining to produce a uranium oxide product.

In alternative embodiments, the phos-acid is first pretreated with a filter, clarification aid, or equivalent, to assist in the removal of suspended solids from the solution, along with a slight degree of dissolved color-body material. In the case of solvent extraction, or the so-called "$2^{nd}$ Generation" systems, there may be a need for a significant degree of dissolved organic (color body) removal due to the potential for emulsion formation within the solvent extraction system itself. For the ion exchange processes of this invention, the degree of color body removal required may be significantly less than with the solvent extraction systems, thus the pretreatment needs for the phos-acid, prior to uranium (U) recovery, are considerably reduced and simplified.

The invention provides processes and methods for the isolation, extraction or recovery of a uranium or a uranium oxide from a wet-process phosphoric acid using a continuous ion exchange system comprising:

(a) providing a phosphoric acid solution, or a solution comprising a phosphoric acid, or a phos-acid feedstock, comprising a uranium or a uranium oxide, wherein optionally the phosphoric acid streams with $P_2O_5$ concentrations ranging from about 1% to about 60% $P_2O_5$/weight, or between about 20% and about 57% $P_2O_5$/weight;

(b) providing a continuous ion exchange system comprising a resin or a material capable of binding the uranium or a uranium oxide (also called "a complexing resin"), wherein optionally the resin or a material comprises or is:

LEWATIT® TP 260™ (Lanxess, Maharashtra, India), a weakly acidic cationic exchange resin with chelating amino methyl phosphoric acid groups for the selective removal of transition heavy metals;

AMBERLITE IRC-747™, an aminophosphonic chelating resin (Dow; Rohm & Haas, Philadelphia, Pa.);

S-930™, a macroporous polystyrene based chelating resin, with iminodiacetic groups designed for the removal of cations of heavy metals (Purolite, Bala Cynwyd, Pa.);

a resin, composition or a material, or a non-resin solid or a semi-solid material, comprising chelating groups, functionalities or moieties that can bind uranium (U) and that comprise iminodiacetic groups, chelating arninoniethyl phosphonic acid groups or aminophosphonic groups, or similar chelating functionalities or moieties, wherein optionally the compositions comprise beads, wires, meshes, nanobeads, nanotubes, nanowires or other nano-structures, or hydrogels.

(c) treating or pre-treating, or filtering, the phosphoric acid solution, solution comprising a phosphoric acid or phos-acid feedstock with a clarification process or a filtering process, or a clarification aid, wherein optionally the clarification process, filtering process or clarification aid comprises an activated clay, an activated carbon, an activated silica, or equivalents or similar clarification material, or any combination thereof;

(d) applying the treated, pre-treated, or clarified solution or phosphoric acid solution or phos-acid feedstock of (c) to the resin, or other chelating material or composition of (b), under conditions that causes the uranium (U) to remain on or bind to the resin or material, wherein optionally an effluent is produced that is substantially free of the uranium (U), and substantially most of the uranium (U) remains bound to the strong cation exchange resin, and optionally the complexing resin, or other chelating material or composition, is used to remove the uranium (U) from the phos-acid and load the uranium (U) onto the selected complexing ion exchange resin;

(e) pretreatment of the loaded chelating resin, or other chelating material or composition, with an alkali solution, optionally an ammonium hydroxide, a sodium hydroxide or equivalent, to neutralize any free acidity in the resin prior to actual regeneration of the resin in the regeneration zone (where the resin is contacted with an alkali carbonate solution); and (f) recovering the uranium (U) from the resin, or other chelating material or composition (or regeneration of the uranium-loaded resin, or other chelating material or composition), by treating the uranium-loaded resin, or other chelating material or composition, with a solution of alkali carbonate or equivalent, to convert the uranium to an anionic carbonate complex which has no affinity for the chelating resin, or the other chelating material or composition, and producing an intermediate primary regeneration solution, which is the same as the primary regeneration solution produced in the first cycle of the dual cycle approach, that is smaller in volume, when compared to the primary phosphoric acid (treated, pre-treated, or clarified solution phosphoric acid solution or phos-acid feedstock) flow, and also contains a higher concentration of uranium in the solution phase.

In alternative embodiments, the alkali solution used in the pretreatment step comprises a portion of the regeneration solution exiting the primary regeneration zone, which is then used to neutralize any free acidity in the resin, or other chelating material or composition, prior to actual resin, or other chelating material or composition, regeneration, wherein with resin, or other chelating material or composition, neutralization any uranium contained in the portion of the regeneration solution used for pretreatment is reloaded onto the resin, or other chelating material or composition, due to the decrease in pH that takes place in the pretreatment stage by virtue of the ammonium carbonate, or equivalent, reacting with traces of entrained acid.

In alternative embodiments, the regenerated resin, or other chelating material or composition, is washed with water, or a slightly acidic solution, to remove any entrained alkali regeneration solution from the resin prior to its reentry into the uranium extraction stage of the continuous ion exchange system.

In alternative embodiments, the processes and methods of the invention further comprise concentration of the intermediate primary regeneration solution (optionally an ammonium uranyl-tricarbonate) in an evaporation unit to reduce the water content and decompose excess alkali carbonate to form bicarbonates and reduce the pH of the solution, resulting in the precipitation of an ammonium uranyl carbonate/oxide material, optionally comprising a uranyl carbonate/oxide filter cake.

In alternative embodiments, the processes and methods of the invention further comprise filtering the uranyl carbonate/oxide precipitate, and then washing the precipitate with a small amount of water to remove the excess alkali carbonate or an entrained carbonate/bicarbonate solution from the uranyl carbonate/oxide filter cake.

In alternative embodiments, the processes and methods of the invention further comprise recovering the ammonia evolved in the decomposition of the excess alkali carbonate with a separate water stream, or with the filtrate, and recycling of the resulting solution to the primary ion exchange system.

In alternative embodiments, the processes and methods of the invention further comprise digestion of the uranyl carbonate/oxide filter cake with an acid solution to produce an acidic, soluble ammonium uranyl salt solution; wherein optionally the acid solution comprises a sulfuric acid, a nitric acid, a hydrochloric acid or an equivalent.

In alternative embodiments, the processes and methods of the invention further comprise treating the uranium-loaded secondary regeneration solution (optionally an ammonium uranyl salt solution) with an alkali solution to raise the pH of the solution to between about pH 2.5 to about pH 7, or to between about pH 3.5 to about pH 6, and optionally the alkali solution comprises an alkali hydroxide, e.g. ammonium hydroxide, sodium hydroxide and the like at concentrations ranging from 10% to about 30%, wherein optionally the alkali solutions have pH's greater than about pH 10 in their solution form.

In alternative embodiments, the processes and methods of the invention further comprise adding hydrogen peroxide to the pH adjusted solution in an amount sufficient to form a uranyl peroxide compound and allow for excess peroxide to be present in the solution to ensure complete uranyl peroxide precipitation.

In alternative embodiments, the processes and methods of the invention further comprise the separation of the uranyl peroxide precipitate from the solution phase, optionally utilizing settling; filtration, centrifugation, or equivalents, then washing the solids with water, optionally washing comprising a washing the solids on a filter, or optionally repulping of the solids with water, followed by settling or filtration or centrifugation or equivalents, and optionally further comprising additional washing of the uranyl peroxide with water to remove the bulk of any entrained secondary solution (uranium-free) via additional filter washing; optionally washing within a centrifuge; or optionally additional repulping with water followed by settling.

In alternative embodiments, the processes and methods of the invention further comprise drying the uranyl peroxide to form a dry solid material, and optionally the dry uranyl peroxide is further heated to a temperature sufficient to decompose, or calcine, the uranyl peroxide and form a uranium oxide compound ($U_3O_8$).

Figure 2:
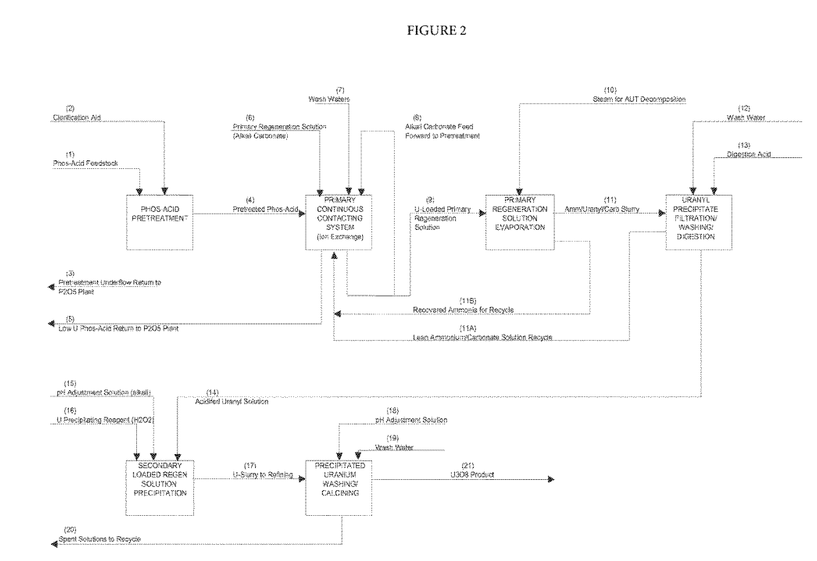
FIG. 2 schematically illustrates an exemplary "single cycle" process of the invention, an overall process flow diagram for this exemplary "single cycle" uranium extraction or recovery process from a phosphoric acid solution, or a solution comprising a phosphoric acid, or a phos-acid feedstock, using ion exchange resins.

The invention provides industrial processes for the isolation, extraction or recovery of uranium from a wet-process phosphoric acid using a continuous ion exchange system, or for isolation, extraction or recovery of a uranium oxide compound ($U_3O_8$), or a uranium (U), comprising an industrial process as set forth in FIG. 1, or FIG. 2, or any portion or sub-process thereof, wherein optionally the uranium oxide compound ($U_3O_8$), or a uranium (U) is extracted, isolated or recovered from a sample, wherein optionally the sample comprises an ore or a mineral ore, or a uraninite ($UO_2$) or a pitchblende ($UO_3$, $U_2O_5$), a gummite, an autunite, a saleeite, a torbernite, a hydrated uranium silicate, a coffinite, a uranophane or a sklodowskite.

The details of one or more embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

BRIEF DESCRIPTION OF THE DRAWINGS

The drawings set forth herein are illustrative of embodiments of the invention and are not meant to limit the scope of the invention as encompassed by the claims.

Figures are described and discussed herein.

Like reference symbols in the various drawings indicate like elements.

Reference will now be made in detail to various exemplary embodiments of the invention, examples of which are illustrated in the accompanying drawings. The following detailed description is provided to give the reader a better understanding of certain details of aspects and embodiments of the invention, and should not be interpreted as a limitation on the scope of the invention.

DETAILED DESCRIPTION

In alternative embodiments, the invention provides processes and methods for the recovery, removal or extracting of, and subsequent purification of uranium from a wet-process phosphoric acid using a continuous ion exchange processing approach, using either a dual or a single extraction process methodology.

Dual Cycle Uranium Extraction Processes

In alternative embodiments, an exemplary "dual cycle" process for the ion exchange route for uranium recovery and purification is shown in FIG. 1. In FIG. 1, the basic process blocks are shown along with the major material inputs and outputs. Stream numbers for the description are noted as follows (stream #):

In alternative embodiments, an exemplary "dual cycle" process for the ion exchange route for uranium recovery and purification is divided into four major areas:

Phosphoric Acid Pretreatment, which can comprise acid cooling (which for the continuous ion exchange system is generally not required, and in exemplary embodiments is not included, but is shown in the Figure for completeness), and acid clarification;

Primary Ion Exchange Extraction and Regeneration System, which contains the primary continuous ion exchange system along with the systems required for preparation of the primary pretreatment and regeneration solutions, and the normally associated peripheries, e.g. surge tanks, etc;

Secondary Ion Exchange Extraction and Regeneration System and the support systems required for secondary regeneration solution preparation and handling;

Uranium (U) Precipitation Circuit, where the secondary U-loaded regeneration solution is pH adjusted and the soluble U precipitated as an insoluble uranyl peroxide material; and, Uranium Washing and Drying-Calcining, comprising one or more uranyl peroxide solid washing steps along with subsequent uranyl peroxide drying and calcining to produce a $U_3O_8$ oxide material.

Exemplary processes of the invention can also comprise uranium packaging and/or storage steps (not shown in FIG. 1); these are standard operations.

Phosphoric Acid Pretreatment:

In alternative embodiments, the acid preparation for the ion exchange approach comprises reducing the suspended solids in a feed acid (e.g., a phos-acid feedstock) to a specific target level, typically to a value of less than about 1,000 ppm suspended solids by weight. It is important to note that some level of solids is tolerable in the continuous contacting system, unlike fixed bed systems, since there is a routine, and sometimes frequent, "cleaning" step within the exemplary continuous ion exchange operation itself.

In alternative embodiments, the incoming phos-acid (1) is cooled, and then treated with a filtering or a clarification aid (2) for suspended solids removal and minor color-body removal, followed by clarification. The solids from this step (3) can be returned to the phos-acid facility. For solvent extraction systems, acid cooling is generally required due to vapor pressure, flammability, and extraction efficiency issues. It has been determined that with the processes of this invention, including exemplary continuous ion exchange approaches of this invention, the extent of acid cooling is not as great and in many cases is not required at all (depending on specific plant situations).

In alternative embodiments, a primary difference between this exemplary "dual cycle" approach and previous solvent extraction methodologies is that when practicing processes of this invention a solid, polymeric, functionalized material, i.e., a resin, is used to extract the uranium (U) from the phos-acid media or source, e.g., a phos-acid feedstock. In alternative embodiments of exemplary processes of this invention, no liquid extractants and diluent solvents, e.g. high grade kerosene, are used; thus, issues with emulsion formation are essentially eliminated.

Primary Ion Exchange Extraction/Regeneration:

In alternative embodiments, the pretreated (filtered or clarified) phos-acid (4) enters the Primary Continuous Contacting System where it is contacted in a continuous unit with the chosen ion exchange resin material, or equivalent alternative material or composition. In alternative embodiments of the contacting systems, the acid passes through the resin material, or equivalent alternative material or composition, where the contained uranium (soluble) is transferred from the phosphoric acid to the resin (or equivalent) matrix itself via a specific ion exchange mechanism. The uranium (U) is in a cationic form when it is extracted. The low uranium acid (5) is then returned to plant.

In alternative embodiments, the resin, or equivalent alternative material or composition, removes the uranium (U) from the acid in a cationic form. Any uranium (U) chelating material can be used; for example, resins that can be used to practice this invention comprise:

LEWATIT® TP 260™ (Lanxess, Maharashtra, India), a weakly acidic cationic exchange resin with chelating amino methyl phosphonic acid groups for the selective removal of transition heavy metals;

AMBERLITE IRC-747™, an aminophosphonic chelating resin (Dow; Rohm & Haas, Philadelphia, Pa.);

S-930™, a macroporous polystyrene based chelating resin, with iminodiacetic groups designed for the removal of cations of heavy metals (Purolite, Bala Cynwyd, Pa.); and, equivalents thereof.

In alternative embodiments, the resin, or equivalent alternative material or composition, that removes the uranium (U) from the acid in a cationic form comprises a resin, a composition or a material, or a non-resin solid or a semi-solid material, comprising chelating groups, functionalities or moieties that can bind uranium (U) and that comprise iminodiacetic groups, chelating aminomethyl phosphonic acid groups or aminophosphonic groups, or similar chelating functionalities or moieties, wherein optionally the compositions comprise beads, wires, meshes, nanobeads, nanotubes, nanowires or other nano-structures, or hydrogels.

These resins are listed for example purposes and in no way limits the use of other similar types of materials, including non-resin solid or semi-solid materials, that can similarly bind uranium (U) and be extracted (eluted) from the material as described herein. For example, beads, wires, meshes, nanobeads, nanotubes, nanowires or other nano-structures, or hydrogels and the like, comprising iminodiacetic groups, chelating aminomethyl phosphonic acid groups or aminophosphonic groups, or similar chelating functionalities or moieties, can be used.

In alternative embodiments, in the case of ion exchange, there is no need for additional post treatment since the extraction media (i.e., the resin or equivalent materials) have no solubility in the phos-acid, $P_2O_5$. In alternative embodiments, uranium contained in the resin is then removed in the regeneration portion or step of this exemplary process of the invention.

In alternative embodiments, the loaded resin from the primary contacting step is washed with a small amount of water (6), which is internally contained, then transfers into the primary pretreatment stage of the contacting system. Within this portion of the continuous contacting system the uranium (U)-loaded resin is contacted with an alkali solution (7) to prepare the resin for regeneration. The spent pretreatment solution (8) is returned to the phos-acid plant waste water systems or can be used as make-up water in the phos-acid, $P_2O_5$ plant fertilizer operations.

In alternative embodiments, the pretreatment step uses a weak alkali solution, such as ammonium hydroxide, to neutralize any residual acid value in the resin. This can be critical in situations where the resin enters the regeneration stage and there is no residual acid value that could react with the ammonium carbonate solution and reduce its pH.

It has also been discovered that by operating a portion of the pretreatment stage in an up-flow mode the resin beds can be expanded during each cycle. This expansion allows for regular cleaning of the resin and enables the continuous ion exchange system to handle a much higher level of solids than either fixed bed systems or alternative solvent extraction systems. Any solids accumulated in the system are then flushed from the resin and transferred to the spent pretreatment solution storage area, then eventually the solids can be disposed of, e.g., to a phos-acid plant's waste solids systems.

In alternative embodiments, the pretreated resin is next contacted with an alkali carbonate solution (9) to remove (e.g., elute) the uranium from the resin and return the resin to its "extraction" form. In this step the alkali carbonate solution converts the uranium to an anionic complex that has no affinity for the ion exchange resin. The uranium thus transfers from the resin phase to the alkali solution phase. The resulting loaded primary regeneration solution (10) is then transferred to the secondary ion exchange processing system. Suitable carbonate solutions include ammonium carbonate, sodium carbonate, potassium carbonate, and the like. The choice of the appropriate solution will typically be plant specific.

In alternative embodiments, it may be critical that the pH in the regeneration stage be above a minimum value. In alternative embodiments the pH of the regeneration solution containing the uranium removed from the resin is above about pH 9.0, or above about pH 9.1, pH 9.2, pH 9.3, pH 9.4, pH 9.5 or pH 9.6 or more. If the pH falls below certain levels the uranium in the regeneration solution can reload onto the resin. While there is no upper pH limit, in alternative embodiments, the ammonium carbonate solution with some slight addition of ammonia has a pH in the range of about pH 9.8 to about pH 10.2, 10.3, 10.4 or 10.5, which is acceptable for this process.

Secondary Ion Exchange Extraction/Regeneration Systems:

In alternative embodiments of the exemplary secondary extraction and regeneration systems of this invention, the loaded primary regeneration solution (10), for example, an alkali carbonate solution or equivalent, is contacted in a secondary ion exchange system. The secondary ion exchange system can be considerably smaller than the primary circuit and different ion exchange resins are used, however the principle of operation is similar to that used in the primary extraction system.

In alternative embodiments, the uranium (U) contained in the loaded primary regeneration solution is transferred to the secondary resin, or equivalent material or composition, comprising an anion material, thus it has a high affinity for the uranium complex in the ammonium carbonate solution. In alternative embodiments, the lean, primary regeneration solution from the secondary system (11) is recycled to the maximum extent possible. In alternative embodiments, the secondary resin, or equivalent material or composition, comprises:

a LEWATIT® K 6267™ (Lanxess, Maharshtra, India), or equivalent;

PUROLITE A-600™, having a functional group comprising a Type 1 quaternary ammonium (Purolite, Bala Cynwyd, Pa.), or equivalent;

any resin, or equivalent material or composition having a high affinity for the uranium complex, e.g., having a functional group comprising a Type 1 quaternary ammonium, or equivalents.

In alternative embodiments, the loaded secondary resin, or equivalent material or composition, is then subjected to a water washing step (12), followed by contacting with a secondary regeneration solution (13) that is acidic, e.g. a weak sulfuric acid, nitric acid, hydrochloric acid or equivalent solution. Neutral salt solutions such as ammonium nitrate; ammonium chloride; sodium chloride; sodium nitrate; and the like can also be used, but the acids are generally preferred, especially sulfuric, due to its compatibility with the existing phos-acid operations. The secondary loaded regeneration solution (14), now containing a high concentration of U, is then transferred to the U precipitation system.

In alternative embodiments, use of an acidic solution, including but not limited to weak sulfuric acid, nitric acid, hydrochloric acid and the like, enhances the secondary regeneration by ensuring that all of the uranium is reconverted to a cationic form, which has no affinity for the anionic resin, or equivalent material or composition.

Before this invention, there was some concern about the use of a low pH solution for the regeneration of the anionic resins, since any residual carbonate solution remaining in the resin after the secondary loading would react with the acid and decompose to form an ammonium salt (e.g. ammonium sulfate) and release carbon dioxide within the resin bed. However, to address this concern, it has been discovered that by practicing a continuous ion exchange approach of this invention, a portion of the regeneration zone can be operated in an up-flow mode; and by operating the initial regeneration contact in this mode there is some level of decomposition and the released $CO_2$ actually assists in the expansion of the resin bed and allows for a level of resin cleaning at the beginning of the regeneration stage.

In alternative embodiments, processes of the invention comprise use of up-flow operations in the ion exchange system. In alternative embodiments, continuous ion exchange systems comprise use of up-flow zones which can be operated with or without the assistance of an air scour to assist the up-flowing liquid in expanding the resin bed and loosening any accumulated solids so they can be flushed from the resin. In alternative embodiments, in the case of the second cycle situation, the release of $CO_2$ within the resin bed allows for "in-situ" gas formation and subsequent resin bed scouring.

Secondary Loaded Regeneration Solution Precipitation:

In alternative embodiments, in the precipitation step, the secondary loaded regeneration solution (14) is combined with an alkali solution, such as ammonium hydroxide, to increase the pH of the secondary regeneration solution to about pH 2.5 to about pH 7.0; or to between about pH 3.5 to about pH 6. After the pH adjustment, a precipitating agent (16), for example, a hydrogen peroxide or equivalent, is added and a uranyl peroxide precipitate is formed. In alternative embodiments the peroxide slurry is then transferred to the decantation, washing and calcining operation.

Precipitated Uranium Washing/Calcining:

In alternative embodiments, as the uranyl peroxide slurry (17) enters this process step, a small amount of pH adjustment reagent (18) can be is added to adjust the pH of the slurry. If the pH of the slurry is low, then an alkali solution, such as ammonium hydroxide or equivalent, can be used for the adjustment. If the slurry is too alkali, i.e. pH too high, then a small amount of acid can be added, e.g. $H_2SO_4$, or equivalent. This mixture is then clarified and the thickened uranyl peroxide sludge washed with a small amount of water (19).

In alternative embodiments, the washed uranyl peroxide solids ($UO_4.2H_2O$) are then centrifuged and the recovered solids transferred to a dryer/calciner system where the uranyl peroxide is decomposed to produce a uranium oxide product (21). The centrate solution is also collected and is filtered. In alternative embodiments some of the spent solutions are recycled to up-stream processes to minimize the overall plant aqueous spent solution volume (20).

In alternative embodiments, the calcined oxide product ($U_3O_8$) is lightly milled then surged and loaded into drums for storage and shipment. A contained drum loading system can be used to minimize the potential for dust emission.

Single Cycle Uranium Extraction Processes

In alternative embodiments, an exemplary "single cycle" process for the ion exchange route uranium recovery and purification is shown in FIG. 2. In FIG. 2, the basic process blocks are shown along with the major material inputs and outputs. Stream numbers for the description are noted as follows (stream #):

In alternative embodiments, the exemplary "single cycle" process is divided into several major areas:

Phosphoric Acid Pretreatment, comprising acid cooling, and filtering or clarification;

Primary Ion Exchange Extraction and Regeneration System, comprising or containing the primary continuous ion exchange system, along with the systems required for preparation of the primary pretreatment and regeneration solutions and the normally associated peripheries, e.g. surge tanks, etc;

Primary Regeneration Solution Evaporation and the support systems required for concentrating the primary regeneration solution and reducing the pH by excess ammonium carbonate decomposition;

Uranyl Precipitate Filtration/Washing/Digestion where the precipitated uranyl material is filtered, washed, then digested with an acid solution to dissolve the uranyl compound and produce an acidic ammonium uranyl salt (soluble);

Uranium Precipitation Circuit wherein the acidic ammonium uranyl salt solution is pH adjusted and the soluble uranium (U) precipitated as an insoluble uranyl peroxide material; and Uranium Washing and Drying-Calcining, comprising uranyl peroxide solids washing steps along with subsequent uranium (U) drying and calcining to produce a $U_3O_8$ oxide material.

Exemplary processes of the invention can also comprise uranium packaging and/or storage steps (not shown in FIG. 2); these are standard operations.

Phosphoric Acid Pretreatment:

In alternative embodiments, the acid preparation for the ion exchange approach comprises reducing the suspended solids in a feed acid (e.g., a phos-acid feedstock) to a specific target level or less than about 1,000 ppm. It is important to note that some level of solids is tolerable in the continuous contacting system, unlike fixed bed ion exchange or solvent extraction systems, since there is a routine, and sometimes frequent, "cleaning" step within the exemplary ion exchange operation itself.

In alternative embodiments, the incoming phos-acid (1) may be cooled and then treated with a clarification aid (2) for suspended solids removal and minor color-body removal, followed by clarification. The solids from this step (3) can be returned to the phos-acid facility. As in the dual cycle case, In alternative embodiments the cooling system may not be required for the operation and will be site specific.

In alternative embodiments, a primary difference between this exemplary process of the invention and previous solvent extraction methodologies is that in this exemplary process of the invention, a solid, polymeric, functionalized material is used to extract the uranium (U) from the phos-acid media. No liquid extractants and diluent solvents, e.g. high grade kerosene, are used in this invention's process, thus issues with emulsion formation and fire/explosion risk are essentially eliminated. As indicated in the dual cycle discussion, in alternative embodiments the elimination of the need for organic diluents, such as kerosene, also eliminates the potential for downstream damage in the existing P2O5 operations that would result from entrained solvent materials.

Primary Ion Exchange Extraction/Regeneration:

In alternative embodiments, the filtered or clarified pretreated phos-acid or phos-acid feedstock (4) enters the Primary Continuous Contacting System wherein it is contacted in a continuous unit with the chosen ion exchange resin or equivalent material or composition. In alternative embodiments the acid passes through the resin material, or equivalent material or composition, where the contained uranium (soluble) is transferred from the phosphoric acid to the resin matrix, or equivalent material or composition, itself via a specific ion exchange mechanism, and the uranium (U) is in the cationic form when it is extracted. The low uranium acid (5) can then returned to plant.

In alternative embodiments, the resin, or equivalent material or composition, removes the uranium (U) from the acid in a cationic form. Any uranium (U) chelating material can be used; for example, resins, or equivalent materials or compositions, that can be used to practice this invention comprise:

LEWATIT® TP 260™ (Lanxess, Maharashtra, India), a weakly acidic cationic exchange resin with chelating amino methyl phosphonic acid groups for the selective removal of transition heavy metals, or equivalents thereof;

AMBERLITE IRC-747™, an aminophosphonic chelating resin (Dow; Rohm & Haas, Philadelphia, Pa.), or equivalents thereof;

S-930™, a macroporous polystyrene based chelating resin, with iminodiacetic groups designed for the removal of cations of heavy metals (Purolite, Bala Cynwyd, Pa.), or equivalents thereof; and, a resin, composition or a material, or a non-resin solid or a semi-solid material, comprising chelating groups, functionalities or moieties that can bind uranium (U) and that comprise iminodiacetic groups, chelating aminomethyl phosphonic acid groups or aminophosphonic groups, or similar chelating functionalities or moieties, wherein optionally the compositions comprise beads, wires, meshes, nanobeads, nanotubes, nanowires or other nano-structures, or hydrogels.

These resins, or equivalent materials or compositions, are listed for example purposes and in no way limits the use of other similar types of materials, including non-resin solid or semi-solid materials, that can similarly bind uranium (U) and be extracted (eluted) from the material as described herein. For example, beads, wires, meshes, nanobeads, nanotubes, nanowires or other nano-structures, or hydrogels and the like, comprising iminodiacetic groups, chelating aminomethyl phosphonic acid groups or aminophosphonic groups, or similar chelating functionalities or moieties, can be used.

In alternative embodiments, when practicing an ion exchange process of this invention, there is no need for additional post treatment, since the extraction media (i.e. resin or equivalent compositions or materials) has no solubility in the $P_2O_5$ (in earlier solvent extraction systems, post-treatment of the phos-acid was of paramount importance since the contained solvent, unless removed to extremely low levels, would have a detrimental impact on the phosphoric acid operation since much of the equipment was rubber lined). The uranium contained in the resin, or equivalent materials or compositions, then can be removed in the regeneration portion of the resin, or equivalent material or composition system.

In alternative embodiments, the loaded resin, or equivalent material or composition, from the primary contacting step is washed with a small amount of water (7), which is internally contained, then transfers into the primary pretreatment stage of the continuous contacting system. Within this portion of the contacting system the U-loaded resin, or equivalent materials or compositions, is contacted with a small amount of the alkali carbonate solution exiting the regeneration system (8) to prepare the resin, or equivalent materials or compositions, for regeneration. The spent pretreatment solution is combined with the loaded regeneration solution exiting the system.

In alternative embodiments, the pretreatment step uses a portion of the regeneration solution that initially exits the regeneration zone. This initial solution has a low uranium content and effectively neutralizes any residual acid value in the resin, or equivalent materials or compositions. This is critical so that when the resin, or equivalent materials or compositions, enters the regeneration stage there is no residual acid value that could react with the ammonium carbonate solution and reduce its pH.

It is further noted that if there are any contained uranium values in the pretreatment solution, this uranium will reload onto the resin, or equivalent materials or compositions, prior to its entry into the regeneration zone. This has the further effect of allowing for some level of uranium separation from the contained contaminants by "crowding" the ion exchange sites with uranium.

It has also been discovered that by operating a portion of the pretreatment stage in an up-flow mode the resin beds can be expanded during each cycle. This expansion allows for regular cleaning of the resin, or equivalent materials or compositions, and enables the continuous ion exchange system to handle a much higher level of solids than either fixed bed systems or alternative solvent extraction systems. Any solids accumulated in the system are then flushed from the resin, or equivalent materials or compositions, and transferred to the spent pretreatment solution storage area, and then eventually the solids are disposed of to the phos-acid plant's waste solids systems.

In alternative embodiments, the pretreated resin, or equivalent materials or compositions, is next contacted with an alkali carbonate solution (6) to remove the uranium (U) from the resin, or equivalent materials or compositions, and return the resin, or equivalent materials or compositions, to its "extraction" form. In this step the alkali carbonate solution converts the uranium to an anionic complex for that has no affinity for the ion exchange resin, or equivalent materials or compositions. The uranium (U) thus transfers from the resin (or equivalent materials or compositions) phase to the alkali solution phase. In alternative embodiments the resulting primary loaded regeneration solution (9) is then transferred to an evaporation system to concentrate the ammonium uranyl tricarbonate solution.

Suitable carbonate solutions include ammonium carbonate, sodium carbonate, potassium carbonate, and the like. The choice of the appropriate solution will typically be plant specific.

In alternative embodiments, it is critical that the pH in the regeneration stage be above a minimum value. In alternative embodiments, the pH of the regeneration solution containing the uranium removed from the resin is above about pH 9.0, or above about pH 9.1, pH 9.2, pH 9.3, pH 9.4, pH 9.5 or pH 9.6 or more. If the pH falls below certain levels the uranium in the regeneration solution can reload onto the resin.

Primary Regeneration Solution Evaporation:

In alternative embodiments of the regeneration solution evaporation system, the loaded primary regeneration solution (9) is heated in an evaporation system using indirect steam (10) to concentrate the ammonium uranyl tricarbonate (AUT) and decompose excess ammonium carbonate to reduce the pH of the mixture which results in a decrease in the solubility of uranium and the formation of an ammonium uranyl/carbonate/oxide precipitate. The ammonia resulting from the decomposition (11B) is recovered and combined with the lean ammonium carbonate stream (11A). This allows for a high degree of recycle within the system and minimization of any resulting spent solutions.

Uranyl Precipitate Filtration/Washing/Digestion:

In alternative embodiments, the precipitated ammonium uranyl/carbonate/oxide slurry (11) is first filtered, then the solids are washed with a small amount of water (12). The washed filter cake is then digested with an acid solution (13) to dissolve the uranium and produce an ammonium uranyl salt solution. In alternative embodiments acids that can be used include sulfuric, nitric, hydrochloric, and the like, with sulfuric acid being preferred if the $P_2O_5$ facility uses $H_2SO_4$. The resulting uranyl salt solution (14) is then transferred to the uranium (U) precipitation system. The lean solution, containing lower pH ammonium carbonate/bicarbonate can be recycled (11A) to the primary "CIX system, or exemplary continuous ion exchange processing of the invention, and can be combined with recovered ammonia and reused.

Uranyl Salt Solution Precipitation:

In alternative embodiments, in a precipitation step, the soluble ammonium uranyl salt solution (14) is combined with an alkali solution (15), such as ammonium hydroxide, to increase the pH of the solution, e.g., to a pH of about 2.5 to about pH 7.0, or between about pH 3.5 to about pH 6. After the pH adjustment, a precipitating agent (16), for example, a hydrogen peroxide or equivalent is added and a uranyl peroxide precipitate formed (17). The peroxide slurry is then transferred to the washing and calcining operation.

Precipitated Uranium Washing/Calcining:

In alternative embodiments, as the uranyl peroxide slurry (17) enters this process step, a small amount of pH adjustment reagent (18) can be is added to adjust the pH of the slurry. If the pH of the slurry is low, then an alkali solution, such as ammonium hydroxide, can be used for the adjustment. If the slurry is too alkali, i.e. pH too high, then a small amount of acid can be added, e.g. $H_2SO_4$, or equivalent. This mixture is then clarified and the thickened uranyl peroxide sludge washed with a small amount of water (19).

In alternative embodiments, the washed uranyl peroxide solids ($UO_4.2H_2O$) is then centrifuged and the recovered solids transferred to a dryer/calciner system where the uranyl peroxide is decomposed to produce a uranium oxide product (21). The centrate solution also can be collected and filtered. Some of the spent solutions are recycled to upstream processes to minimize the overall plant aqueous spent solution volume (20).

In alternative embodiments, the calcined oxide product ($U_3O_8$) is lightly milled then surged and loaded into drums for storage and shipment. A contained drum loading system can be used to minimize the potential for dust emission.

Although many parts of the exemplary Dual Cycle and Single Cycle procedures of the invention can be identical, for example, the acid cleanup, most of the primary extraction, and from the precipitation and drying sections to the end product. In alternative embodiments, one difference is that in the dual cycle, there is a second so-called "CIX system", or exemplary continuous ion exchange processing of the invention, whereas in the single cycle, there is no second CIX system, which is essentially replaced with evaporation of the primary regeneration solution and a different treatment of the concentrated primary regeneration solution to make the acidified uranyl solution (ammonium uranyl sulfate) common to both processes (line 14 in each diagram). From there the processes are again can be, depending on the exemplary embodiment, identical.

Without further elaboration, it is believed that one skilled in the art can, using the preceding description, utilize the present invention to its fullest extent. The following examples are to be considered illustrative and thus are not limiting of the remainder of the disclosure in any way whatsoever.

A number of embodiments of the invention have been described. Nevertheless, it will be understood that various modifications may be made without departing from the spirit and scope of the invention. Accordingly, other embodiments are within the scope of the following claims.

What is claimed is:

1. A process for isolation, extraction, or recovery of uranium from phosphoric acid comprising uranium using a continuous ion exchange system, the process comprising:
    (a) providing phosphoric acid comprising uranium;
    (b) pretreating the phosphoric acid to reduce suspended solids;
    (c) providing a continuous ion exchange system comprising cationic exchange (CE) resin comprising a chelating group that binds uranium;
    (d) applying the pretreated phosphoric acid to the CE resin under continuous conditions that cause the uranium to bind to the CE resin; and
    (e) recovering the uranium by treating the CE resin with an alkali solution to neutralize free acid in the CE resin and followed by regenerating the CE resin with an alkali carbonate solution at a pH that is greater than about 9.0, to produce a primary loaded regeneration solution and a regenerated CE resin.

2. The process of claim 1, wherein the pretreating comprises filtering or clarifying the phosphoric acid using an activated clay, an activated carbon, an activated silica, or a combination thereof.

3. The process of claim 1, wherein the CE resin comprises:
    a weakly acidic cationic exchange resin with chelating amino methyl phosphonic acid groups;
    an aminophosphonic chelating resin;
    a macroporous polystyrene based chelating resin with iminodiacetic groups; or
    a composition comprising an agent having chelating groups, functionalities, or moieties that bind uranium or that comprise iminodiacetic groups, chelating aminomethyl phosphonic acid groups, or aminophosphonic groups, wherein optionally, the composition comprises beads, wires, meshes, nanobeads, nanotubes, or hydrogels.

4. The process of claim 1, wherein regenerating the CE resin comprises converting the uranium to an anionic uranyl carbonate complex, and producing the regenerated CE resin and the primary loaded regeneration solution comprising the anionic uranyl carbonate complex.

5. The process of claim 4, the process further comprising washing the regenerated CE resin with water or a slightly acidic solution prior to reentry of the CE resin into the continuous ion exchange system.

6. The process of claim 5, the process further comprising treating the primary loaded regeneration solution in a second continuous ion exchange system comprising an anion exchange (AE) resin, wherein the anionic uranyl carbonate complex is removed from the primary loaded regeneration solution.

7. The process of claim 6, the process further comprising treating the AE resin with water solution to produce a washed AE resin.

8. The process of claim 7, the process further comprising treating the washed AE resin with an acidic solution to remove uranium from the AE resin by converting the uranium in the anionic uranyl carbonate complex to a cationic form and to produce a secondary loaded regeneration solution containing the uranium and a regenerated AE resin, wherein optionally, the acidic solution comprises a weak sulfuric acid, nitric acid, or hydrochloric acid.

9. The process of claim 8, wherein treating the washed AE resin with the acidic solution is carried out in an up-flow operational mode and results in the decomposition of residual carbonate solution in the AE resin resulting in production of the secondary loaded regeneration solution containing uranium.

10. The process of claim 9, the process further comprising treating the regenerated AE resin with water.

11. The process of claim 10, the process further comprising post-treating the AE resin with an alkali solution to neutralize any residual acid in the resin prior to its reentry into the second continuous ion exchange system.

12. The process of claim 9, the process further comprising treating the secondary loaded regeneration solution with an alkali solution to raise the pH of the solution from about pH 2.5 to about pH 7, or from about pH 3.5 to about pH 6, to obtain a pH adjusted solution, wherein optionally, the alkali solution comprises an alkali hydroxide, an ammonium hydroxide, or a sodium hydroxide, at a concentration ranging from 10% to about 30%; and optionally, the alkali solution has a pH greater than pH 10.

13. The process of claim 12, the process further comprising adding hydrogen peroxide to the pH adjusted solution in an amount sufficient to form a uranyl peroxide precipitate and to ensure complete uranyl peroxide precipitation.

14. The process of claim 13, the process further comprising separating uranyl peroxide precipitate from the pH adjusted solution, by (i) settling, filtering, or centrifuging, followed by washing with water, or (ii) washing on a filter or repulping with water, followed by settling, filtering, or centrifuging; and wherein optionally, the process further comprises additional washing of the uranyl peroxide precipitate with water.

15. The process of claim 14, the process further comprising drying the uranyl peroxide precipitate to form a dry solid.

16. The process of claim 15, the process further comprising heating the dry solid to a temperature sufficient to decompose or calcine the dry solid to form uranium oxide ($U_3O_8$).

17. The process of claim 1, wherein the phosphoric acid comprises uranium in any oxidation state.

18. The process of claim 1, wherein the phosphoric acid in step (a) is from a wet-process phosphoric acid.

19. A process for isolation, extraction or recovery of uranium from phosphoric acid using a continuous ion exchange system, the process comprising:
(a) providing phosphoric acid comprising uranium;
(b) pretreating the phosphoric acid to reduce suspended solids;
(c) providing a continuous ion exchange system comprising a cationic exchange (CE) resin comprising a chelating group that binds uranium;
(d) applying the pretreated phosphoric acid to the resin under continuous conditions that causes the uranium to remain on or bind to the CE resin;
(e) pretreating the CE resin with an alkali solution, to neutralize free acid in the resin prior to regeneration of the resin; and
(f) recovering the uranium and regenerating the CE resin, by regenerating the CE resin with an alkali carbonate solution at a pH that is greater than 9.0 to convert the uranium to an anionic carbonate complex to produce a primary loaded regeneration solution and a regenerated CE resin.

20. The process of claim 19, wherein pretreating comprises filtering or clarifying the phosphoric acid using an activated clay, an activated carbon, an activated silica, or a combination thereof.

21. The process of claim 19, wherein the CE resin comprises:
a weakly acidic cationic exchange resin with chelating amino methyl phosphonic acid groups;
an aminophosphonic chelating resin;
a macroporous polystyrene based chelating resin with iminodiacetic groups; or
a composition comprising an agent having chelating groups, functionalities, or moieties that bind uranium or that comprise iminodiacetic groups, chelating aminomethyl phosphonic acid groups, or aminophosphonic groups, wherein optionally, the composition comprises beads, wires, meshes, nanobeads, nanotubes, or hydrogels.

22. The method of claim 19, wherein the method further comprises in the continuous ion exchange system of pretreating the CE resin with alkali solution comprising a portion of the primary regeneration solution, thereby reloading uranium contained in the primary regeneration solution onto the CE resin.

23. The process of claim 19, wherein the regenerated CE resin is washed with water or a slightly acidic solution prior to reentry into the continuous ion exchange system.

24. The process of claim 19, further comprising concentrating the primary loaded regeneration solution in an evaporation unit to reduce the water content and decomposing excess alkali carbonate to form bicarbonates and reduce the pH of the solution, to form a uranyl precipitate.

25. The process of claim 24, further comprising filtering the uranyl precipitate followed by washing the precipitate with water to remove excess alkali carbonate or an entrained carbonate/bicarbonate solution from the uranyl precipitate.

26. The process claim 24, further comprising recovering gas evolved in the decomposition of excess alkali carbonate with a separate water stream, or with the filtrate, and recycling resulting solution to the continuous ion exchange system.

27. The process of claim 24, the process further comprising digesting the uranyl precipitate with an acid solution to produce a secondary loaded regeneration solution containing a soluble uranyl salt; wherein optionally, the acid solution comprises a sulfuric acid, a nitric acid, or a hydrochloric acid.

28. The process of claim 27, the process further comprising treating the secondary regeneration solution with an alkali solution to raise the pH of the solution from about pH 2.5 to about pH 7, or from about pH 3.5 to about pH 6, and wherein optionally, the alkali solution comprises an alkali hydroxide, and wherein optionally the alkali solution has a pH greater than about pH 10.

29. The process of claim 28, the process further comprising adding hydrogen peroxide to the pH adjusted solution in an amount sufficient to form a uranyl peroxide precipitate and to ensure complete uranyl peroxide precipitation.

30. The process of claim 29, the process further comprising separating the uranyl peroxide precipitate from the pH adjusted solution, by (i) settling, filtering, or centrifuging, followed by washing with water, or (ii) washing the precipitate on a filter, or repulping of the precipitate with water, followed by settling, filtering, centrifuging; and wherein optionally, the process further comprises additional washing of the uranyl peroxide precipitate with water.

31. The process of claim 30, the process further comprising drying the uranyl peroxide to form a dry solid.

32. The process of claim 31, the process further comprising heating the dry solid to a temperature sufficient to decompose or calcine the dry solid to form uranium oxide ($U_3O_8$).

33. The process of claim 19, wherein the phosphoric acid comprises uranium in any oxidation state.

34. The process of claim 19, wherein the phosphoric acid in step (a) is from a wet-process phosphoric acid.

* * * * *

UNITED STATES PATENT AND TRADEMARK OFFICE
CERTIFICATE OF CORRECTION

PATENT NO. : 9,702,026 B2
APPLICATION NO. : 14/416271
DATED : July 11, 2017
INVENTOR(S) : William W Berry et al.

It is certified that error appears in the above-identified patent and that said Letters Patent is hereby corrected as shown below:

In the Claims

Column 20, Claim 22, Line 48, change "The method of claim 19, wherein the method" to --The process of claim 19, wherein the process--.

Column 21, Claim 27, Line 4, change "claim 24" to --claim 25--.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*